Patented Oct. 10, 1950

2,525,252

UNITED STATES PATENT OFFICE 2,525,252

CYCLO-TRIMETHYLENETRINITRAMINE

Francis George Willson, New Eltham, London, Aquila Forster, Farnborough, and Elwyn Roberts, Eltham, London, England, assignors to Minister of Supply, in His Majesty's Government of the United Kingdom of Great Britain and Northern Ireland, London, England No Drawing. Application February 25, 1948, Serial No. 10,918

8 Claims. (Cl. 260—248)

In the manufacture of cyclonite (cyclotrimethylene-trinitramine) by nitration of hexamine (hexamethylene tetramine) with concentrated nitric acid it has hitherto been found difficult, particularly when operating on a large scale, to obtain the cyclonite in the coarsely-crystalline free-flowing form free from floury material necessary for convenient handling in the subsequent operations of filtration, purification, and use in explosive munitions.

This is a result of the course of the nitration reaction, which produces along with cyclonite a number of by-products which may react violently and incontrollably with the excess of nitric acid present, particularly when the strength of this excess nitric acid is reduced by the gradual addition of water to precipitate the cyclonite in crystalline, free-flowing form.

An object of the present invention is to provide a safe means of isolating from nitration mixtures substantially pure cyclonite wholly in a coarsely crystalline condition facilitating further processing or handling, together with nitric acid in a form suitable for reconcentration and oxides of nitrogen which may also be re-converted into nitric acid.

According to the present invention the nitration mixture (which, according to the conditions of nitration, may or may not contain cyclonite in suspension as well as in solution) is run into either water or aqueous nitric acid of 50–70 per cent. strength, previously heated to and maintained by heating or cooling at a temperature between 40° and 90° C., preferably 65–75° C., and well stirred. By carrying out the dilution under these conditions, the cyclonite is obtained, in not materially diminished yield, wholly in a coarsely crystalline, free-flowing form on which the subsequent operations of filtration, purification, and general handling are most readily carried out; at the same time the hazards associated with the operation of diluting the nitration mixture by the gradual addition of water thereto (to obtain the desired form of the product) are eliminated, because the decomposition of the unstable, diluted nitration mixture proceeds as the nitration mixture is added to the warm water or diluted nitric acid so that the decomposition is always under control.

A study of the reactions concerned and the conditions governing the decomposition has shown that the decomposition is promoted by the oxides of nitrogen produced in the decomposition itself, and that occasionally the initiation of the decomposition may be delayed due to absence of these in the initial stages. When this happens the amount of undecomposed material in the mixtures of nitration solution or suspension and the diluting water or aqueous nitric acid may become undesirably high before the decomposition sets in, and the initial stages of the decomposition be therefore undesirably vigorous. Once the decomposition has started it invariably proceeds smoothly at a rate entirely controlled by that of the addition of the nitration mixture.

It is therefore an optional variant of the invention to add previously to the diluting water or acid a substance, such as a metallic nitrite or paraformaldehyde which reacts with the nitric acid at the temperature concerned to produce oxides of nitrogen. Alternatively the decomposition may be initiated by heating the dilution mixture to a higher temperature than that which is desirably maintained during the main part of the dilution.

In putting the invention into effect one may start with a diluting agent comprising 50–70 per cent. nitric acid and add to it simultaneously the nitration mixture and water in such relative proportions that the diluted mixture remains at a substantially constant strength in respect of nitric acid.

In a further variant of the invention the volume of the decomposing diluted acid solution may be kept substantially constant during the addition of the nitration mixture (and water if any is required) by drawing off continuously, at the necessary rate a mixture of diluted acid and cyclonite as a suspension and feeding this to the filters.

Operating as described in the preceding paragraph it is clear that the process of the invention is entirely suitable for use with a continuous process for nitrating hexamine although the scope of the invention is by no means limited to such applications.

During the combined dilution and decomposition copious evolution occurs of a mixture of gases rich in oxides of nitrogen which may be conducted away from the reaction vessel and recovered in any convenient manner. Completion of the decomposition may be ensured by maintaining the diluted reaction mixture at 65–75° C. for a period of between 15 and 30 minutes after the nitration mixture has been added. In operating continuously this may be provided for in the dimensioning and design of the dilution vessel.

Whilst the yield of cyclonite can be slightly increased by diluting the decomposed mother liquor to 20 per cent. nitric acid and cooling to say 20° C. the increase in yield does not compensate for the additional cost of reconcentrating the nitric acid from the more dilute mother liquor and it is therefore preferred that the final dilution be limited to that required to yield a mother liquor containing not less than 50 per cent. HNO$_3$. which is then cooled.

The process according to the invention provides a safe means of obtaining substantially pure cyclonite in granular form which is easily filtered from the decomposed mother liquor and may be further purified in the known manner by washing and/or grinding and boiling in water.

The decomposed mother liquor after separation from the precipitated product contains only traces of cyclonite and may be subjected directly to the customary processes for the recovery of nitric acid in concentrated form.

The following examples in which the parts are by weight are given by way of illustration of the processes according to the invention.

Example 1

Hexamine, 40 parts, was added to 320 parts 99.5 per cent. nitric acid keeping the temperature at 20° C. The reaction mixture was then maintained at 20° C. for 20 minutes when 25.4 parts cyclonite separated out. It was afterwards added slowly with efficient stirring to 27 parts 50.2 per cent. nitric acid previously heated to 50° C. and to which had been added a small quantity of sodium nitrite or paraformaldehyde. Decomposition of by-products set in immediately when the temperature rose and was controlled within the range 65° C. to 75° C. by external cooling. After adding the reaction mixture the whole was maintained within this range of temperature for 15 minutes to complete the decomposition. It was then cooled to 20° C. and after standing for 15 minutes the cyclonite was filtered off and subsequently washed with water and dried at 85° C. for 24 hours. Yield 47.1 parts; 74.3 per cent. of theory on basis of 222 parts (1 mol.) cyclonite per 140 parts (1 mol.) hexamine. Acidity of mother liquor 52.2 per cent HNO$_3$.

Example 2

Hexamine, 10 parts, was added to 110 parts 98.0 per cent. nitric acid keeping the temperature at 20° C. The reaction mixture was then maintained at 20° C. for 20 minutes when no crystalline product separated out. It was afterwards added slowly with efficient stirring to 7 parts 70.0 per cent. nitric acid previously heated to 70° C. and to which had been added a small quantity of sodium nitrite or paraformaldehyde. Decomposition of by-products set in immediately when the temperature rose and was controlled at about 70° C. by external cooling. After adding the reaction mixture the whole was maintained at this temperature to complete the decomposition. It was then cooled to 5° C. and after standing for 15 minutes the cyclonite was filtered off and subsequently washed with water and dried at 85° C. for 24 hours. Yield 12.35 parts; 77.8 per cent. theory on basis of 222 parts (1 mol.) cyclonite per 140 parts (1 mol.) hexamine. Acidity of mother liquor 67.9 per cent. HNO$_3$.

Example 3

Hexamine, 30 parts, was added to 360 parts 99.5 per cent. nitric acid keeping the temperature at 20° C. The reaction mixture was then maintained at 20° C. for 20 minutes, when no crystalline product separated out. The reaction mixture was afterwards added simultaneously with 130 parts water, while maintaining efficient stirring, to 27 parts 50.2 per cent. nitric acid previously heated to 50° C. and to which had been added a small quantity of sodium nitrite or paraformaldehyde. Decomposition of by-products set in immediately when the temperature rose and was controlled within the range 65° C. to 75° C. by external cooling. After adding the reaction mixture the whole was maintained within this range of temperature for 15 minutes to complete the decomposition. It was then cooled to 20° C. and after standing for 15 minutes the cyclonite was filtered off and subsequently washed with water and dried at 85° C. for 24 hours. Yield 37.9 parts; 79.6 per cent. theory on basis of 222 parts (1 mol.) cyclonite per 140 parts (1 mol.) hexamine. Acidity of mother liquor 50.3 per cent. HNO$_3$.

Example 4

Hexamine (200 parts) was nitrated by gradual addition to nitric acid (2200 parts of 97.7 per cent. strength) in the usual manner at 20° C. The resulting solution was added gradually to water (400 parts) at 87° C., with stirring. A vigorous reaction started after about 75 parts of the nitration mixture had been added, and the temperature of the dilution mixture rose to about 98° C. During the further addition of the nitration mixture, 400 parts of water was also added batchwise at intervals, 50 parts at a time. The dilution mixture was then cooled, and the precipitated cyclonite collected and washed in the usual manner. The product was in the form of a sandy, free-flowing, crystalline powder, yield 185 parts of satisfactory stability (1.2 ml. in 40 hours at 120° C. in the Vacuum Stability test). The filtrate comprised 1350 parts of 48 per cent. nitric acid.

Example 5

In the continuous process for the preparation of cyclonite, dry hexamine and nitric acid (99.5 per cent. HNO$_3$) are fed through appropriate measuring devices in the proportion (by weight) of 1:8 to 1:12.5 into a nitrating vessel. The nitrating vessel is divided into three compartments fitted with efficient stirrers, baffles, cooling arrangements and overflow pipe. At the commencement of the operation the nitrating vessel is filled with nitric acid (99.5 per cent. HNO$_3$) and the hexamine and nitric acid feeds set in operation. The admixture of hexamine and nitric acid occurs in the first compartment from which it flows successively through two other compartments, and overflows into a diluter. The temperature of nitration is maintained at 20 to 25° C. and the rates of flow of hexamine and nitric acid such that the total time of reaction mixture in the nitrator is not less than 20 minutes. The diluter is divided into four compartments fitted with an inlet for dilution water, cooling arrangements, efficient stirrers, ventilator hood and overflow pipe. At the commencement of the operation the diluter is filled with 55 per cent. nitric acid at 90° C. As the reaction mixture flows from the nitrator into the diluter, decomposition sets in after a short interval of time with formation of oxides of nitrogen and dilution water is fed into the first compartment at such a rate as to maintain a concentration of 55 per cent. (approx.) HNO$_3$ meanwhile lowering and maintaining the temperature at 75° C. The rates of flow of reaction mixture and dilution water are such that the total time of the diluted reaction mixture in the diluter is not less than 40 minutes. The gases of decomposition are sucked into a trunk system and are recovered by the usual procedure. During the decomposition in the diluter the cyclonite separates out in a crystalline state. The suspension of cyclonite in mother liquor overflows into a vessel in which it is cooled and subsequently it is fed to a filter and the cyclonite washed with water. It is then transferred as a suspension in water and fed continuously into a grinding mill and thence to a vat in which it is boiled with water for 24 hours. After cooling it is isolated by filtration and stored in the moist condition. The acidity of the final product does not exceed 0.035 per cent. $HNO_3$.

The mother liquor is recovered by the usual procedure.

We claim:

1. A process for isolating cyclonite in coarsely crystalline free-flowing form from hexamine nitration mixtures, which comprises adding said nitration mixtures gradually with agitation to an aqueous dilution medium, maintaining the temperature of the dilution medium between 40° and 90° C. during the addition, and continuing the addition until the dilution medium has a concentration of not more than 70% of nitric acid.

2. A process for isolating cyclonite in coarsely crystalline free-flowing form from hexamine nitration mixtures, which comprises adding said nitration mixtures gradually with agitation to an aqueous dilution medium, maintaining the temperature of the dilution medium between 65° and 75° C. during the addition, and continuing the addition until the dilution medium has a concentration of not more than 70% of nitric acid.

3. A process for isolating cyclonite in coarsely crystalline free-flowing form from hexamine nitration mixtures, which comprises adding said nitration mixtures gradually with agitation to an aqueous dilution medium, maintaining the temperature of the dilution medium between 40° and 90° C. during the addition, and controlling the addition so that the dilution medium has a final concentration between 50% and 70% of nitric acid.

4. A process for isolating cyclonite in coarsely crystalline free-flowing form from hexamine nitration mixtures, which comprises adding said nitration mixtures gradually with agitation to an aqueous dilution medium containing from 50% to 70% of nitric acid, maintaining the temperature of the dilution medium between 40° and 90° C. during the addition, and continuing the addition until the dilution medium has a concentration of not more than 70% of nitric acid.

5. A process for isolating cyclonite in coarsely crystalline free-flowing form from hexamine nitration mixtures, which comprises adding separately said nitration mixtures and water gradually with agitation to an aqueous dilution medium containing from 50% to 70% of nitric acid, maintaining the temperature of the dilution medium between 40° and 90° C. during the addition, and controlling the addition so that the concentration of the nitric acid in the dilution medium remains substantially constant.

6. A process for isolating cyclonite in coarsely crystalline free-flowing form from hexamine nitration mixtures, which comprises adding said nitration mixtures gradually with agitation to an aqueous dilution medium containing oxides of nitrogen, maintaining the temperature of the dilution medium between 40° and 90° C. during the addition, and continuing the addition until the dilution medium has a concentration of not more than 70% of nitric acid.

7. A process for isolating cyclonite in coarsely crystalline free-flowing form from hexamine nitration mixtures, which comprises adding said nitration mixtures gradually with agitation to an aqueous dilution medium containing an agent for producing oxides of nitrogen selected from the group consisting of metallic nitrites and paraformaldehyde, maintaining the temperature of the dilution medium between 40° and 90° C. during the addition, and continuing the addition until the dilution medium has a concentration of not more than 70% of nitric acid.

8. A process for isolating cyclonite in coarsely crystalline free-flowing form from hexamine nitration mixtures, which comprises adding said nitration mixtures gradually with agitation to an aqueous dilution medium which has been previously heated to a higher temperature than that maintained during the step of dilution whereby the presence of oxides of nitrogen is insured, maintaining the temperature of the dilution medium between 40° and 90° C. during the addition, and continuing the addition until the dilution medium has a concentration of not more than 70% of nitric acid.

FRANCIS GEORGE WILLSON.
AQUILA FORSTER.
ELWYN ROBERTS.

REFERENCES CITED

The following references are of record in the file of this patent:

UNITED STATES PATENTS

| Number | Name | Date |
| --- | --- | --- |
| 2,208,934 | Meissner | July 23, 1940 |
| 2,395,773 | Wyler | Feb. 26, 1946 |
| 2,418,753 | Burtle | Apr. 8, 1947 |
| 2,439,648 | Burtle | Apr. 13, 1948 |

OTHER REFERENCES

Desvergnes, Chemie and Industrie, vol. 28, No. 5, November, 1932, pp. 1039–1044.